(12) United States Patent
Nakahara

(10) Patent No.: US 7,039,284 B2
(45) Date of Patent: May 2, 2006

(54) OPTICAL WAVEGUIDE INCORPORATING SUBMEDIA

(75) Inventor: Tsuneo Nakahara, Tokyo (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 141 days.

(21) Appl. No.: 10/730,052

(22) Filed: Dec. 9, 2003

(65) Prior Publication Data

US 2004/0136671 A1 Jul. 15, 2004

(30) Foreign Application Priority Data

Jan. 10, 2003 (JP) ............................. 2003-004700

(51) Int. Cl.
*G02B 6/20* (2006.01)
*G01N 23/00* (2006.01)

(52) U.S. Cl. .................... 385/125; 385/129; 65/378

(58) Field of Classification Search ........ 385/123–127, 385/129–132, 141–145; 65/377, 378
See application file for complete search history.

(56) References Cited

U.S. PATENT DOCUMENTS

| | | |
|---|---|---|
| 3,938,974 A | 2/1976 | Macedo et al. |
| 4,110,093 A | 8/1978 | Macedo et al. |
| 4,110,096 A | 8/1978 | Macedo et al. |
| 4,181,403 A | 1/1980 | Macedo et al. |
| 4,183,620 A | 1/1980 | Macedo et al. |
| 4,188,198 A | 2/1980 | Macedo et al. |
| 4,220,682 A | 9/1980 | Macedo et al. |
| 4,224,177 A | 9/1980 | Macedo et al. |
| 4,236,930 A | 12/1980 | Macedo et al. |
| 4,244,721 A | 1/1981 | Gupta et al. |
| 4,299,608 A | 11/1981 | Macedo et al. |
| 4,302,231 A | 11/1981 | Macedo et al. |
| 4,312,774 A | 1/1982 | Macedo et al. |
| 4,313,748 A | 2/1982 | Macedo et al. |
| 4,319,905 A | 3/1982 | Macedo et al. |
| 5,802,236 A * | 9/1998 | DiGiovanni et al. ........ 385/127 |
| 6,539,155 B1 * | 3/2003 | Broeng et al. .............. 385/125 |
| 6,571,045 B1 | 5/2003 | Hasegawa et al. |
| 6,614,974 B1 * | 9/2003 | Elrefaie et al. ............. 385/125 |
| 2003/0180029 A1 * | 9/2003 | Garito et al. ............... 385/142 |
| 2004/0134138 A1 * | 7/2004 | LaRue ....................... 52/169.1 |

FOREIGN PATENT DOCUMENTS

JP 2000-35521 A 2/2000

(Continued)

OTHER PUBLICATIONS

Sugi, M., et al. "O-Guide and X-Guide: An Advanced Surface Wave Transmission Concept," IRE Transactions on Microwave Theory and Techniques, pp. 5.

(Continued)

*Primary Examiner*—Brian Healy
*Assistant Examiner*—Michael P. Mooney
(74) *Attorney, Agent, or Firm*—McDermott Will & Emery LLP

(57) ABSTRACT

An optical waveguide (optical fiber, for example) having low transmission loss, nonlinearity, and chromatic dispersion and facilitating the termination work for its end portions. An optical fiber 10 comprises a main medium 11 in which minute regions 12 composed of a multitude of submedia are distributed. The main medium 11 is made of silica glass, for example. The submedium in each minute region 12 is formed by a vacuum or a gas, such as an inert gas or air. The submedia have a refractive index smaller than that of the main medium 11. Each minute region 12 does not extend along the axis C.

5 Claims, 3 Drawing Sheets

FOREIGN PATENT DOCUMENTS

| | | |
|---|---|---|
| JP | 2001-201648 A | 7/2001 |
| JP | 2001-272569 | 10/2001 |

OTHER PUBLICATIONS

Katayama, M., et al, "Optical Materials, Fabrication, and Characterization: CWF31: X-ray written optical waveguides in germanosilicate glasses." CLEO '98. Conference on Lasers and Electro-Optics, May 3-8, 1998, CWF31, pp. 3 Total.

Chemical Society of Japan, Autumnal Convention, Sep. 20-23, 2001, 2P5A-09 (Prior Art cited in the specification and English Translation thereof).

1995 Autumn The Japan Society of Applied Physics Annual meeting, Aug. 26-29, 1985, 16p-P13-5 published on Aug. 26, 1995, and English Translation thereof.

Optics Japan 1998, Sep. 18-19, 1998818p1A01 published on Sep. 18, 1998 by JST.

* cited by examiner

OPTICAL WAVEGUIDE INCORPORATING SUBMEDIA

BACKGROUND OF THE INVENTION

1. Field of the Invention

The present invention relates to an optical waveguide incorporating submedia.

2. Description of the Background Art

An optical fiber, which belongs to the category of the optical waveguide, is used, for example, as the optical transmission line in an optical communications system. The system usually uses an optical fiber in which doped materials are dispersed with a cylindrically symmetrical concentration distribution in the matrix made of silica glass. The optical fiber has a refractive-index profile determined by the concentration distribution of the doped material. The chromatic dispersion, one of the properties of an optical fiber, is determined by both the material dispersion, which is determined by the composition (matrix and doped material), and the waveguide dispersion, which is determined by the refractive-index profile.

The chromatic dispersion of an optical fiber is designed by properly determining the refractive-index profile. For example, a standard single-mode optical fiber has a chromatic dispersion of 0 ps/nm/km at a wavelength of about 1.3 μm and a chromatic dispersion of 16 to 20 ps/nm/km or so at a wavelength of 1.55 μm. It is also possible to obtain a dispersion-compensating optical fiber having a negative chromatic dispersion at a wavelength of 1.55 μm with an absolute value of several tens in ps/nm/km. Furthermore, it is possible to obtain a dispersion-shifted optical fiber having a chromatic dispersion of a single-digit number in ps/nm/km.

However, when the light travelling in these optical fibers has a large power, the waveform of the light deteriorates due to an optical nonlinear phenomenon. In addition, the cumulative dispersion of the optical fiber also deteriorates the waveform of the light. The reduction in transmission loss in these optical fibers has a limitation due to the presence of the doped material.

Recently, the published Japanese patent application Tokukai 2000-35521 has disclosed an optical fiber whose main medium includes submedia longitudinally extending along the axis of the fiber. According to the cross section perpendicular to the fiber axis, the optical fiber has a core region formed by a hollow and a cladding region composed of a main medium and submedia placed at constant intervals in the main medium. The cladding region forms a photonic bandgap structure. The optical fiber utilizes the Bragg reflection of the light in the photonic bandgap structure to contain the light in the core region surrounded by the cladding region so that the light can be transmitted. The optical fiber having a photonic bandgap structure can form the core region with a hollow. Consequently, the optical fiber holds promise of reducing the transmission loss, nonlinearity, and chromatic dispersion.

However, the above-described optical fiber has a hollow core region extending continuously along its axis. Therefore, foreign matters intruding into the hollow core from the end may deteriorate the optical properties. Accordingly, the optical fiber is required to seal its both ends to prevent foreign matters from entering. This termination work takes time and consumes man power. In addition, the optical fiber having a photonic bandgap structure allows part of the energy of the travelling light to enter the region of the photonic bandgap structure. As a result, the optical fiber cannot sufficiently reduce the transmission loss, nonlinearity, and chromatic dispersion.

SUMMARY OF THE INVENTION

An object of the present invention is to offer an optical waveguide whose end portions are easily terminated.

According to the present invention, the foregoing object is attained by offering an optical waveguide provided with a refractive-index profile for transmitting light. The optical waveguide comprises:
(a) a main medium; and
(b) a multitude of submedia that:
   (b1) have a refractive index smaller than that of the main medium; and
   (b2) are distributed in the main medium such that the submedia form minute regions each of which exists locally in the cross section perpendicular to the direction of the light travelling in the optical waveguide without extending along the axis of the optical waveguide.

The refractive-index profile of the optical waveguide is formed based on one member selected from the group consisting of:
(c) the refractive-index profile of the main medium itself;
(d) the numerical distribution density of the minute regions;
(e) the individual size of the minute regions; and
(f) the numerical distribution density and individual size of the minute regions.

According to one aspect of the present invention, the present invention offers a method of producing an optical waveguide provided with a refractive-index profile for transmitting light. The method comprises:
(a) a first step for producing an intermediate, the intermediate comprising:
   (a1) a main medium; and
   (a2) a multitude of submedia that:
      (a2a) have a refractive index smaller than that of the main medium; and
      (a2b) are distributed in the main medium such that the submedia form minute regions each of which exists locally in the cross section perpendicular to the direction of the light travelling in the optical waveguide without extending along the axis of the optical waveguide; and
(b) a second step for providing the intermediate with the refractive-index profile for transmitting light.

Advantages of the present invention will become apparent from the following detailed description, which illustrates the best mode contemplated to carry out the invention. The invention can also be carried out by different embodiments, and their details can be modified in various respects, all without departing from the invention. Accordingly, the accompanying drawing and the following description are illustrative in nature, not restrictive.

BRIEF DESCRIPTION OF THE DRAWING

The present invention is illustrated to show examples, not to show limitations, in the figures of the accompanying drawing. In the drawing, the same reference numerals refer to similar elements.

In the drawing.

DETAILED DESCRIPTION OF THE INVENTION

Figure 1A:
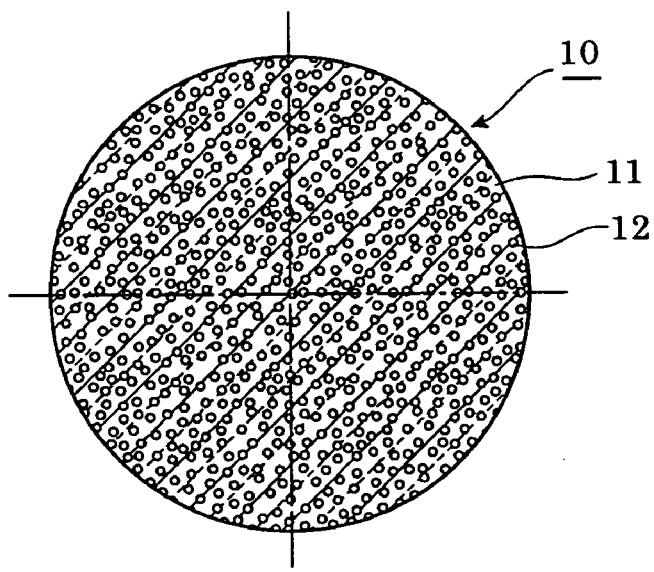
FIG. 1A is a view showing the cross section perpendicular to the axis of an optical waveguide (optical fiber) 10 in the first embodiment.
Figure 1B:
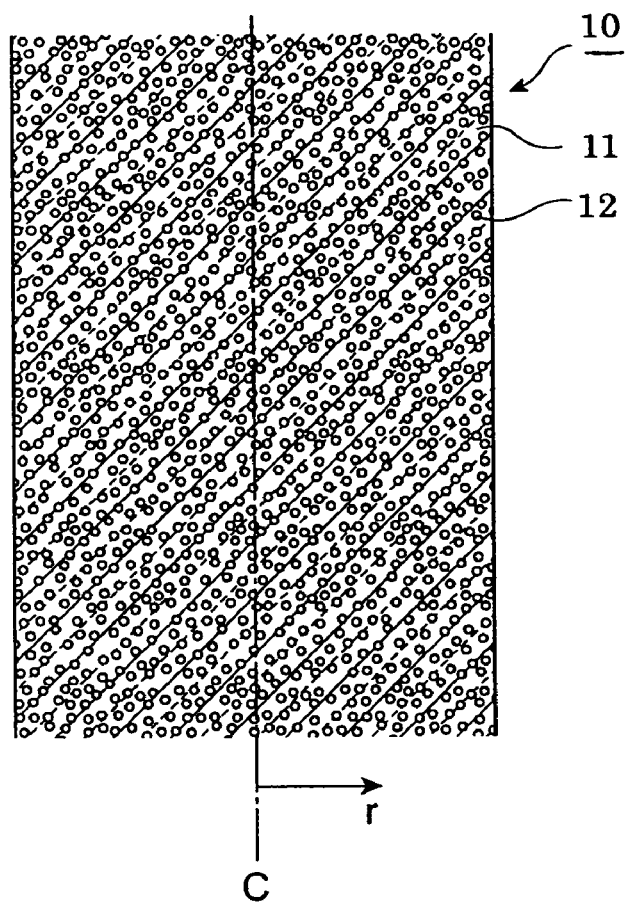
FIG. 1B is a view showing the longitudinal cross section including the axis of the optical fiber 10.

FIG. 1A is a view showing the cross section perpendicular to the axis C of an optical waveguide (optical fiber) 10 in the first embodiment. FIG. 1B is a view showing the longitudinal cross section including the axis C of the optical fiber 10. The optical fiber 10 has an outside shape similar to that of the conventional optical fiber. The cross section perpendicular to the axis C is circular, and the fiber is long along the axis C.

The optical fiber 10 comprises a main medium 11 in which a multitude of minute regions 12 composed of a submedium are distributed. The main medium 11 is made of silica glass, for example. The submedium in each minute region 12 is formed by a vacuum or a gas, such as an inert gas or air. The submedium has a refractive index smaller than that of the main medium 11. Each minute region 12 has a nearly spherical shape, ellipsoidal shape, or a shape formed by linking a plurality of spherical regions. In other words, it does not extend along the axis C.

When the diameter is used as a representative size of each minute region 12, it is desirable that each minute region 12 have a diameter of at most $1/10$ the wavelength of the light travelling in the optical fiber 10, more desirably at most $1/100$, yet more desirably at most $1/1,000$. More specifically, for example, when the travelling light has a wavelength falling in a 1.55-μm band, it is desirable that each minute region 12 have a diameter of at most 150 nm, more desirably at most 15 nm, yet more desirably a couple of nanometers.

The minute regions 12 are distributed nearly uniformly in the entire main medium 11. The refractive index of the main medium 11 varies with the radial distance r from the axis C. For example, it decreases with increasing distance r. The refractive-index profile of the main medium 11 determines the radial average-refractive-index profile of the optical fiber 10. The average-refractive-index profile is formed such that light can travel in the fiber. The average refractive index can be calculated from the refractive indexes of the main medium 11 and the submedia in the minute regions 12 and the volume percentages of the main medium 11 and the minute regions 12.

Figure 2A:
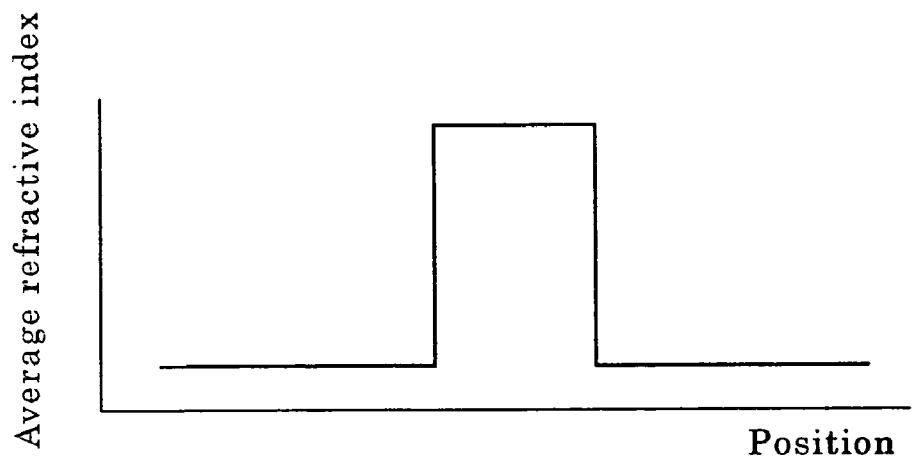
FIGS. 2A, 2B, and 2C are diagrams showing examples of the average-refractive-index profile of the optical fiber 10.
Figure 2B:
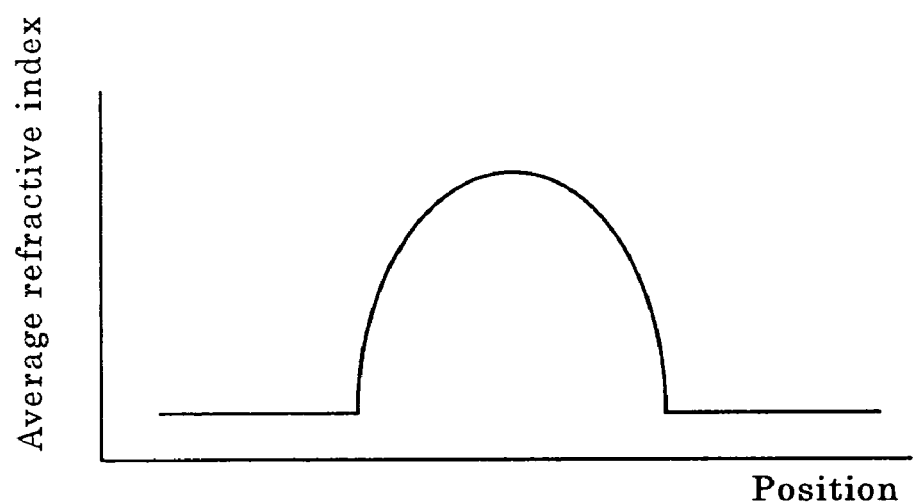
Figure 2C:
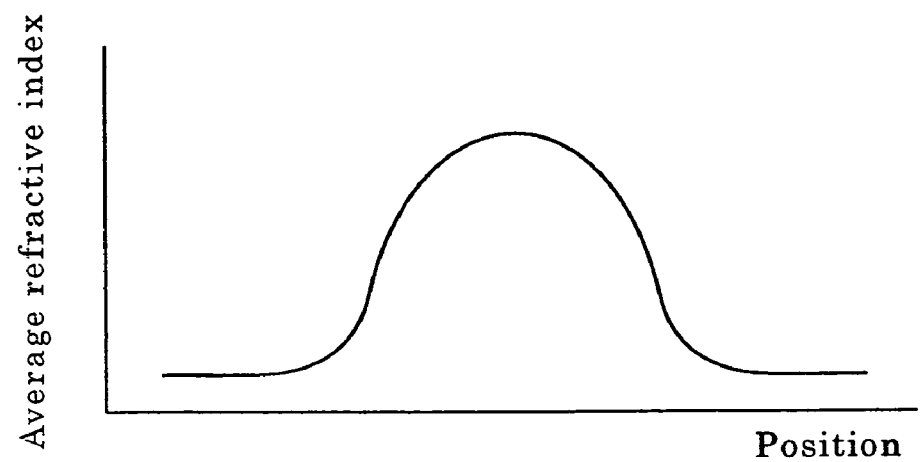

FIGS. 2A, 2B, and 2C are diagrams showing examples of the average-refractive-index profile of the optical fiber 10. In these figures, the axis of abscissas represents the radial position and the axis of ordinates represents the average refractive index. The average-refractive-index profile of the optical fiber 10 may be:

(a) a step-index type as shown in FIG. 2A;
(b) a graded-index type as shown in FIG. 2B; or
(c) a gradually decreasing type as shown in FIG. 2C, in which the average refractive index decreases continuously with increasing radial distance r.

It is desirable that the average-refractive-index profile produce a radial optical-energy distribution expressed by, for example, the Gauss' function or the Laguerre's function.

As described above, in the first embodiment, the optical waveguide (optical fiber) 10 has the minute regions 12 each of which does not extend along the axis C. Therefore, its termination work is easy. The optical waveguide is formed as an optical fiber. The optical fiber is suitable for use as an optical transmission line because it can be easily produced with a long length. The gas used as the submedium reduces the material dispersion. In addition, the nonlinearity and chromatic dispersion can also be decreased. When the minute region 12 has a size of at most $1/10$ the wavelength of the light travelling in the fiber, the effect of the Rayleigh scattering is decreased and therefore the transmission loss can be reduced.

Figure 3A:
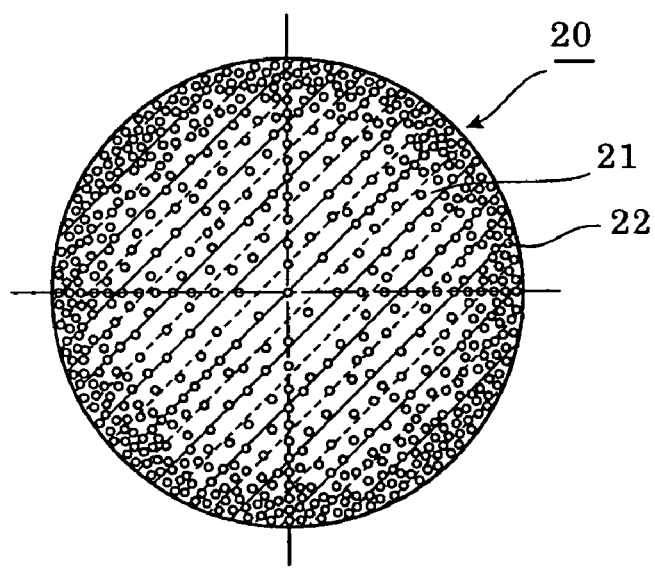
FIG. 3A is a view showing the cross section perpendicular to the axis of an optical waveguide (optical fiber) 20 in the second embodiment.
Figure 3B:
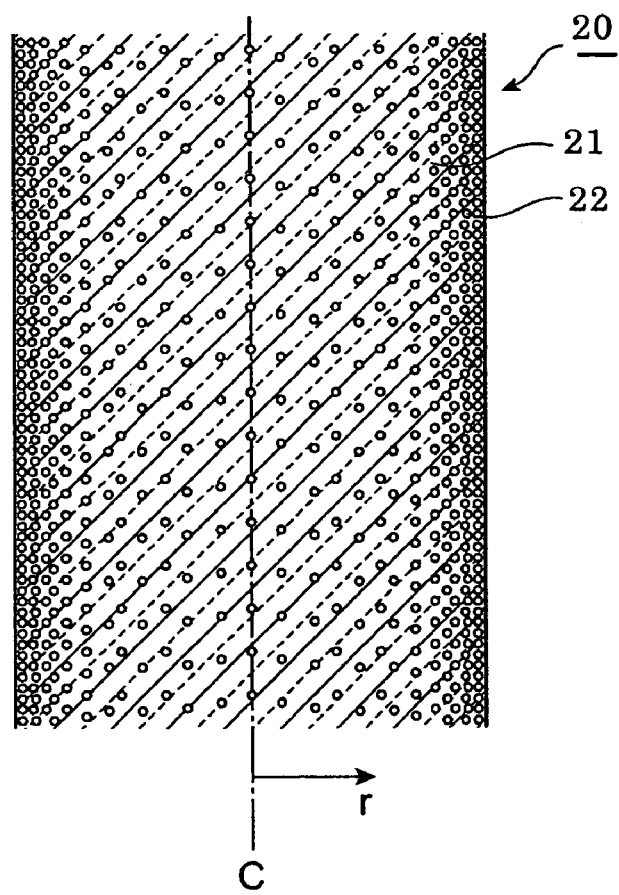
FIG. 3B is a view showing the longitudinal cross section including the axis of the optical fiber 20.

FIG. 3A is a view showing the cross section perpendicular to the axis C of an optical waveguide (optical fiber) 20 in the second embodiment. FIG. 3B is a view showing the longitudinal cross section including the axis C of the optical fiber 20. The optical fiber 20 has an outside shape similar to that of the conventional optical fiber. The cross section perpendicular to the axis C is circular, and the fiber is long along the axis C.

The optical fiber 20 comprises a main medium 21 in which minute regions 22 composed of a multitude of submedia are distributed. The main medium 21 is made of silica glass, for example. The submedium in each minute region 22 is formed by a vacuum or a gas, such as an inert gas or air. The submedium has a refractive index smaller than that of the main medium 21. Each minute region 22 has a nearly spherical shape or a shape formed by linking a plurality of spherical regions. In other words, it does not extend along the axis C.

When the diameter is used as a representative size of each minute region 22, it is desirable that each minute region 22 have a diameter of at most $1/10$ the wavelength of the light travelling in the optical fiber 20, more desirably at most $1/100$, yet more desirably at most $1/1,000$. More specifically, for example, when the travelling light has a wavelength falling in a 1.55-μm band, it is desirable that each minute region 22 have a diameter of at most 150 nm, more desirably at most 15 nm, yet more desirably a couple of nanometers.

The distribution density or individual size of the minute regions 22 varies radially in the main medium 21. The distribution density and individual size of the minute regions 22 determine the radial average-refractive-index profile of the optical fiber 20. The average-refractive-index profile is formed such that light can travel in the fiber. The average refractive index can be calculated from the refractive indexes of the main medium 21 and the submedia in the minute regions 22 and the volume percentages of the main medium 21 and the minute regions 22.

For example, as the radial distance r from the axis C increases, the distribution density of the minute regions 22 gradually increases, and accordingly the average refractive index decreases gradually. As shown in FIGS. 2A, 2B, and 2C, the radial average-refractive-index profile of the optical fiber 20 may be (a) a step-index type, (b) a graded-index type, or (c) a gradually decreasing type, in which the average refractive index decreases continuously with increasing radial distance r. It is desirable that the average-refractive-index profile produce a radial optical-energy distribution expressed by, for example, the Gauss' function or the Laguerre's function.

Having the structure as described above, the optical fiber 20 facilitates its termination work. In addition, the transmission loss, nonlinearity, and chromatic dispersion can be decreased.

The optical fibers 10 and 20 described in the above embodiments are suitable for use as an optical transmission line for transmitting femtosecond-pulse laser light. More specifically, because they have a reduced transmission loss, non-linearity, and chromatic dispersion, they can transmit with high quality femtosecond-pulse laser light, which has a high power in a broad band.

Next, one embodiment of the method of producing the optical fiber according to the present invention is explained. In this embodiment, an optical fiber is produced by the process including the following steps:
(a) a first step for producing a fibrous intermediate in which minute regions composed of a multitude of submedia are distributed in the main medium; and
(b) a second step for providing the intermediate with a refractive-index profile for transmitting light.

The first step can be performed, for example, by the sol-gel process. The second step can be performed, for example, by utilizing the nonlinearity-originated self-focusing property of high-power laser light, such as YAG laser light or femtosecond-pulse laser light, so that the main medium can be provided with the refractive-index profile. The second step can also be performed by irradiating the center portion of the intermediate from its side with high-energy rays, such as X rays, ultraviolet rays, or corpuscular rays, so that the specific portions of the main medium constituting the intermediate can be modified.

For example, the first step is performed by the following procedure. This step first prepares a fibrous material made of glass having a hollow region that includes the center of axis and extends along the axis. It is desirable that the hollow region have a diameter of at least 10 μm. The fibrous material is provided with a plurality of through holes that connect the side surface to the hollow region. A glass-sol solution is introduced into the hollow region by osmosis through the through holes. The solution filling the hollow region gelatinizes, so that a multitude of submedia (cavities) are distributed in the main medium (glass). In the second step, the self-focusing of the high-power laser light or the irradiation of the high-energy rays forms a refractive-index profile in the main medium. Thus, the optical fiber is provided with a radial refractive-index profile. In addition, it is desirable that the circumferential surface of the optical fiber be coated with an ultraviolet cure resin or a thermosetting resin to reinforce the optical fiber mechanically. Alternatively, it is also desirable the circumferential surface of the optical fiber be coated with a material in which fibers made of glass, carbon, crystalline resin, or another proper substance are bonded by a synthetic resin.

In the first step, the glass-sol solution can be replaced with an organic solution. This type of method is reported by M. Jikei et al in the report entitled "Preparation of aromatic polyamide aerogels by supercritical fluid extraction with carbon dioxide" (the Chemical Society of Japan, Autumnal Convention, Sep. 20–23, 2001, 2P5A-09). According to the report, the solution to be filled in the hollow region of the fibrous material comprises, for example:
(a) p-phenylenediamine (PD) or 4,4'-diaminobiphenyl ether (ODA);
(b) trimesic acid (TMA);
(c) a condensing agent composed of triphenyl phosphite and pyridine; and
(d) a polymerization solvent composed of N-methylpyrrolidone (NMP).

The solution is introduced into the hollow region by osmosis to fill the hollow region. The NMP used as the polymerization solvent is solvent-replaced with ethanol. Polyamide aerogel is produced by supercritical fluid extraction with carbon dioxide. The solvent replacement shrinks the gel to 80% to 90% or so. After the gel is supercritically dried, the gel has a size of about 70% to 76% of the size when the gel is prepared. On the other hand, natural drying after the solvent replacement shrinks the gel to about 47%. The above-described process forms pores (minute regions) each having a radius of about 10 nm. Therefore, the minute regions can constitute at least 90% of the total volume.

Alternatively, the first step can be performed as follows. First, the use of the phase separation method produces a fibrous material in which minute regions composed of a multitude of dummy media are distributed in the main medium (silica glass, for example). An intermediate is formed by removing the dummy media by using the leaching method. The use of the particle sintering and internal extraction method can also produce a fibrous intermediate in which minute regions composed of a multitude of submedia are distributed in the main medium. Subsequently, the second step is performed as follows. The main medium is provided with a refractive-index profile by utilizing the non-linearity-originated self-focusing property of high-power laser light, such as YAG laser light or femtosecond-pulse laser light. Alternatively, the specific portions of the main medium constituting the intermediate is modified by irradiating the center portion of the intermediate from its side with high-energy rays, such as X rays, ultraviolet rays, or corpuscular rays. Thus, the optical fiber is provided with a radial refractive-index profile.

There is still another alternative. This alternative first produces a fibrous intermediate in which minute regions composed of a multitude of polymers are distributed in the main medium (silica glass, for example). Then, the polymers are removed by a burning-out treatment. A foaming agent is injected into the fibrous intermediate with a specific distribution. The foaming agent is foamed by heating. Thus, the optical fiber is provided with a radial refractive-index profile. In this case, the regions of the submedia of the optical fiber are formed by the foamed foaming agents.

The present invention is described above in connection with what is presently considered to be the most practical and preferred embodiments. However, the invention is not limited to the disclosed embodiments, but, on the contrary, is intended to cover various modifications and equivalent arrangements included within the spirit and scope of the appended claims.

For example, the optical waveguide described in the foregoing embodiments has the form of a fiber. However, the optical waveguide may be formed directly on a flat substrate. The main medium of the optical waveguide described in the foregoing embodiments is made of silica glass. However, the main medium may be made of another material, such as another type of glass or a synthetic resin.

The entire disclosure of Japanese patent application 2003-004700 filed on Jan. 10, 2003 including the specification, claims, drawing, and summary is incorporated herein by reference in its entirety.

What is claimed is:

1. An optical waveguide provided with a refractive-index profile for transmitting light, the optical waveguide comprising:
 (a) a main medium; and
 (b) a multitude of submedia that:
  (b1) have a refractive index smaller than that of the main medium; and (b2) are distributed in the main medium such that the submedia form minute regions each of which exists locally in the cross section perpendicular to the direction of the light travelling in the optical waveguide without extending along the axis of the optical waveguide;

the refractive-index profile being formed based on at least one of:

(c) the numerical distribution density of the minute regions; and (d) the individual size of the minute regions;

wherein the submedia are made of gas.

2. An optical waveguide as defined by claim 1, wherein the main medium is made of one material selected from the group consisting of glass and synthetic resin.

3. An optical waveguide as defined by claim 1, wherein each of the minute regions has a size of at most $\frac{1}{10}$ the wavelength of the light travelling in the optical waveguide.

4. An optical waveguide as defined by claim 1, the optical wave guide being an optical fiber.

5. A method of producing an optical waveguide provided with a refractive-index profile for transmitting light, the method comprising:

(a) a first step for producing an intermediate, the intermediate comprising:

(a1) a main medium; and (a2) a multitude of submedia that:

(a2a) are made of gas and have a refractive index smaller than that of the main medium; and (a2b) are distributed in the main medium such that the submedia form minute regions each of which exists locally in the cross section perpendicular to the direction of the light travelling in the optical waveguide without extending along the axis of the optical waveguide; and (b) a second step for providing the intermediate with the refractive-index profile for transmitting light the refractive-index profile being formed based on at least one of:

(c) the numerical distribution density of the minute regions; and (d) the individual size of the minute regions.

* * * * *